US008379556B2

(12) United States Patent
Choi et al.

(10) Patent No.: US 8,379,556 B2
(45) Date of Patent: Feb. 19, 2013

(54) METHOD AND APPARATUS FOR MANAGING POWER OF WLAN MODULE IN PORTABLE TERMINAL

(75) Inventors: Jong-Mu Choi, Gunpo-si (KR); Jun-Yeop Jung, Suwon-si (KR); Jeong-Hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 12/797,048

(22) Filed: Jun. 9, 2010

(65) Prior Publication Data

US 2010/0315983 A1 Dec. 16, 2010

(30) Foreign Application Priority Data

Jun. 12, 2009 (KR) .......................... 10-2009-0052540

(51) Int. Cl.
 *G08C 17/02* (2006.01)
(52) U.S. Cl. ........................................ 370/311; 455/574
(58) Field of Classification Search .................. 370/311, 370/318, 338, 252; 455/574
 See application file for complete search history.

(56) References Cited

U.S. PATENT DOCUMENTS

| | | | |
|---|---|---|---|
| 2004/0192284 A1* | 9/2004 | Vaisanen et al. | 455/422.1 |
| 2004/0259542 A1* | 12/2004 | Viitamaki et al. | 455/426.2 |
| 2005/0114444 A1* | 5/2005 | Brown et al. | 709/203 |
| 2005/0221869 A1* | 10/2005 | Liu et al. | 455/574 |
| 2006/0120314 A1* | 6/2006 | Krantz et al. | 370/311 |
| 2007/0036096 A1* | 2/2007 | Sinivaara | 370/318 |
| 2008/0052545 A1* | 2/2008 | Finkelstein et al. | 713/300 |
| 2008/0219192 A1* | 9/2008 | Sim et al. | 370/310 |
| 2009/0103501 A1* | 4/2009 | Farrag et al. | 370/337 |
| 2010/0080156 A1* | 4/2010 | Nichols et al. | 370/311 |
| 2010/0278087 A1* | 11/2010 | Kawakami et al. | 370/311 |
| 2011/0019555 A1* | 1/2011 | Gotoh et al. | 370/252 |

* cited by examiner

*Primary Examiner* — Brian D Nguyen
(74) *Attorney, Agent, or Firm* — Jefferson IP Law, LLP

(57) ABSTRACT

A method and an apparatus for managing power of a Wireless Local Area Network (WLAN) module in a portable terminal are provided. In the method, the WLAN module is operated according to a Power Save Mechanism (PSM). Whether the portable terminal operates in a sleep state is determined. At least one of a beacon interval and a Delivery Traffic Indication Map (DTIM) interval of the PSM is changed depending on whether the portable terminal operates in the sleep state.

12 Claims, 5 Drawing Sheets

METHOD AND APPARATUS FOR MANAGING POWER OF WLAN MODULE IN PORTABLE TERMINAL

PRIORITY

This application claims the benefit under 35 U.S.C. §119 (a) of a Korean patent application filed in the Korean Intellectual Property Office on Jun. 12, 2009 and assigned Serial No. 10-2009-0052540, the entire disclosure of which is hereby incorporated by reference.

BACKGROUND OF THE INVENTION

1. Field of the Invention

The present invention relates to a method and an apparatus for managing power of a Wireless Local Area Network (WLAN) module in a portable terminal. More particularly, the present invention relates to a method and an apparatus for managing power of a WLAN module by changing a beacon interval and a Delivery Traffic Indication Map (DTIM) interval depending on a state of a portable terminal.

2. Description of the Related Art

Recently, portable terminals having a Wireless Local Area Network (WLAN) function allowing a wireless network access have been introduced into the consumer market. The portable terminal accesses a wireless network through an Access Point (AP) that operates as a bridge and a router between the portable terminal and the network using a WLAN module. The above WLAN function provides better performance than other short distance wireless communication techniques with respect to communication speed. However, since data transmission between the WLAN and the AP may occur at anytime, the power of the WLAN module should always be turned on and maintained, thereby resulting in excessive power consumption.

Accordingly, a Power Save Mechanism (PSM) has been suggested in order to reduce power consumption caused by the WLAN module of the portable terminal. FIG. 1 is a view illustrating the PSM according to the related art. Referring to FIG. 1, a portable terminal that uses the PSM repeats an operation of maintaining an awake state 103 of the WLAN module and switches to a sleep state 105 on a beacon interval 101 basis. More particularly, when a packet to be transmitted/received exists, the portable terminal maintains the awake state 103 without switching to the sleep state 105 by exchanging a Traffic Indication Map (TIM)/ACKnowledge (ACK) packet during the awake state 103. For example, when a packet is to be transmitted from a terminal A 111 to a terminal B 113, the terminal A 111 transmits a TIM packet while in the awake state 103. After the terminal B 113 receives the TIM packet while in the awake state 103, the terminal B 113 transmits an ACK packet to the terminal A 111. Thereby, data communication has been performed by exchanging packets without switching to the sleep state 105. In contrast, a terminal C 115 having no packet to be transmitted/received switches from the awake state 103 to the sleep state 105.

FIG. 2 is a view illustrating a relationship between a beacon and a Delivery Traffic Indication Map (DTIM) according to the related art.

Referring to FIG. 2, a beacon interval 201 and a DTIM interval 203 are shown. Each terminal that uses the PSM maintains the awake state 103 during a relevant beacon interval by periodically selecting one beacon interval in order to receive a multicast or broadcast packet. Here, the selected beacon interval is referred to as a DTIM interval 203. That is, the terminal continues to maintain an awake state without switching to the sleep state during a DTIM interval that repeats at a fixed interval.

While a portable terminal enters a sleep mode because a user's input does not occur within a predefined time, that is, a host processor enters the sleep mode, a probability of receiving a multicast or broadcast packet is significantly reduced. However, the conventional portable terminal performs the PSM of the WLAN regardless of the state of the host processor, and accordingly, power is consumed unnecessarily. For example, the host processor of the portable terminal enters the sleep mode and the probability of receiving the multicast or broadcast packet is significantly reduced. However, since the WLAN maintains an awake state during a DTIM section periodically, power is wasted.

SUMMARY OF THE INVENTION

An aspect of the present invention is to address at least the above-mentioned problems and/or disadvantages and provide at least the advantages described below. Accordingly, an aspect of the present invention is to provide a method and an apparatus for managing power of a Wireless Local Area Network (WLAN) module in a portable terminal.

Another aspect of the present invention is to provide a method and an apparatus for managing power of a WLAN module provided inside a portable terminal depending on a state of the portable terminal.

Still another aspect of the present invention is to provide a method and an apparatus for reducing power consumption of a WLAN module by changing a beacon/Delivery Traffic Indication Map (DTIM) interval depending on an active/sleep state of a portable terminal.

In accordance with an aspect of the present invention, a method for managing power of a WLAN module in a portable terminal is provided. The method includes operating the WLAN module according to a Power Save Mechanism (PSM), determining whether the portable terminal operates in a sleep state, and changing at least one of a beacon interval and a DTIM interval of the PSM depending on whether the portable terminal operates in the sleep state.

In accordance with another aspect of the present invention, an apparatus for managing power of a WLAN module in a portable terminal is provided. The apparatus includes a host processor for detecting whether the portable terminal operates in a sleep state, and the WLAN module that operates according to a PSM, and that changes at least one of a beacon interval and a DTIM interval of the PSM depending on whether the portable terminal operates in the sleep state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the single forms "a," "an," and "the" include plural referents unless the context clearly dictates otherwise. Thus, for example, reference to "a component surface" includes reference to one or more of such surfaces.

Exemplary embodiments of the present invention provide a technique for managing power of a Wireless Local Area Network (WLAN) module included with a portable terminal depending on an active/sleep state of the portable terminal. In the following description, the active/sleep state (mode) of the portable terminal denotes an active/sleep state of a host processor for controlling and processing overall operations of the portable terminal. In addition, a power save mode denotes a mode of repeatedly switching between an awake state and a sleep state according to the Power Save Mechanism (PSM) of the related art. Here, the awake state (or awake mode) denotes a state where the WLAN module operates with power of a predefined level or more to transmit/receive a packet. The sleep state denotes a state where the WLAN module operates with power of less than the predefined level and packet transmission/reception is not performed. In addition, a beacon interval denotes an interval where a section for Traffic Indication Map (TIM) transmission/reception repeats itself. The WLAN module may be switched from an awake state to a sleep state, or may maintain the awake state during the beacon interval. The Delivery Traffic Indication Map (DTIM) interval denotes an interval having a repeating DTIM section. The DTIM section denotes a section where an awake state is maintained for receiving a multicast or broadcast packet.

Figure 1:
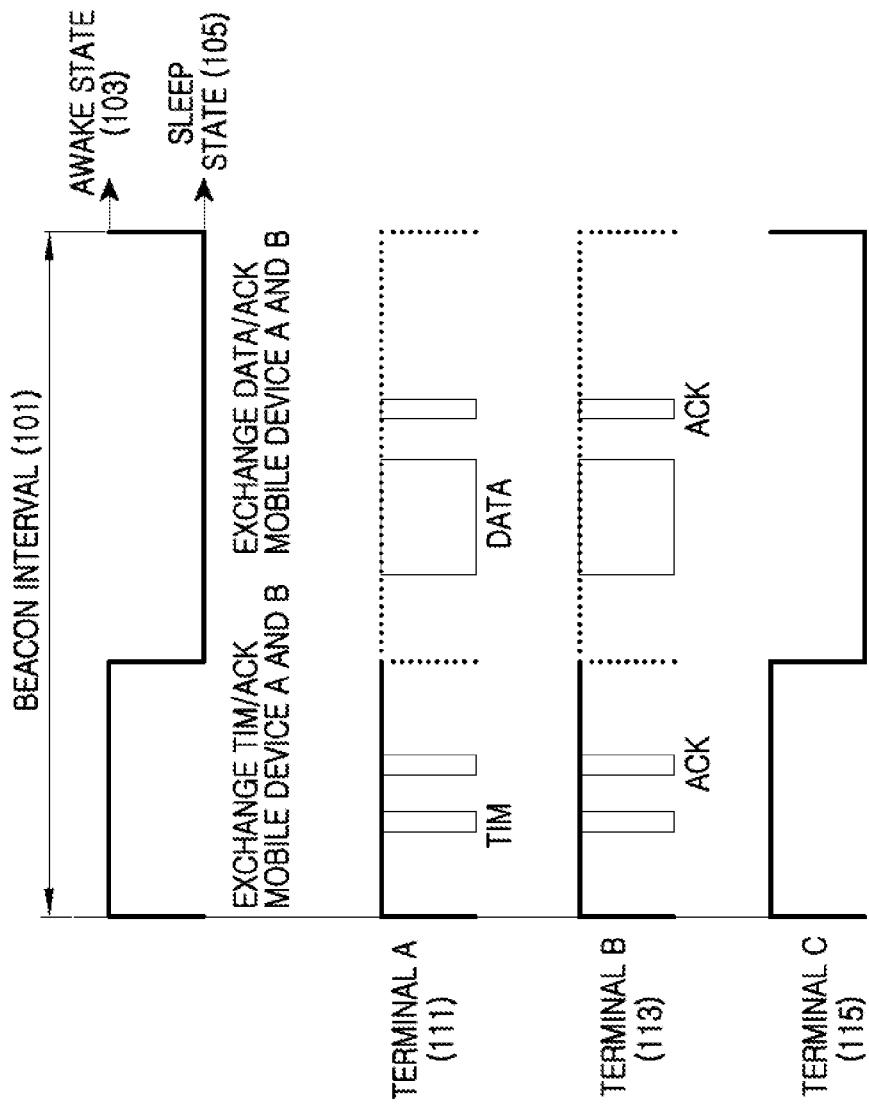
FIG. 1 is a view illustrating a Power Save Mechanism (PSM) according to the related art.
Figure 2:
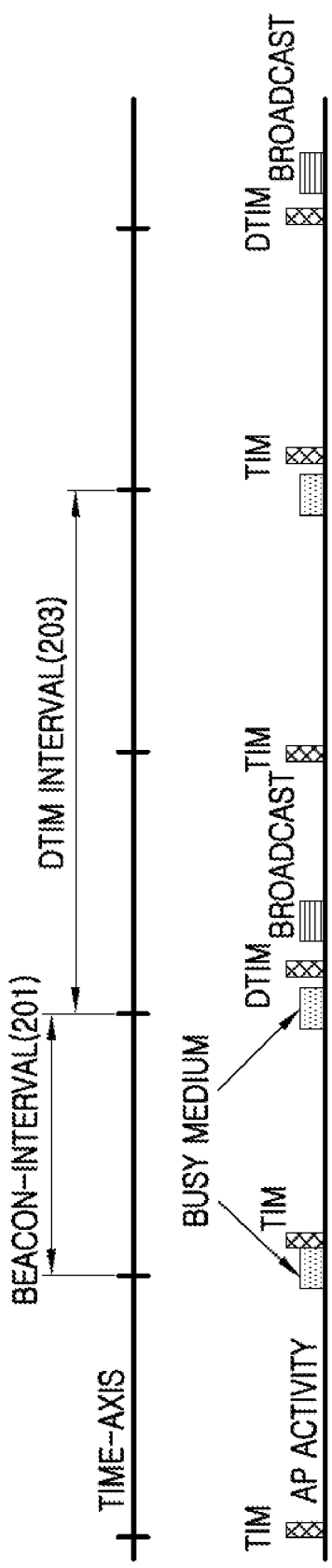
FIG. 2 is a view illustrating a relationship between a beacon and a Delivery Traffic Indication Map (DTIM) according to the related art.
Figure 3:
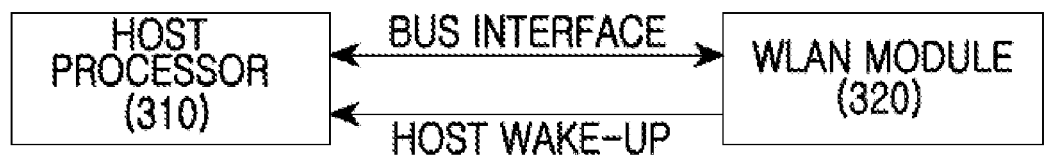
FIG. 3 is a block diagram illustrating a portable terminal according to an exemplary embodiment of the present invention.

FIG. 3 is a block diagram illustrating a portable terminal according to an exemplary embodiment of the present invention.

Referring to FIG. 3, the portable terminal includes a host processor 310 and a WLAN module 320.

The host processor 310 controls and processes overall operations of the portable terminal When an application that uses WLAN is performed, the host processor 310 supplies power to the wireless LAN module 320. In addition, the host processor 310 requests the WLAN module 320 switch to a power save mode that operates according to the PSM. When there is no user's input or a packet is not received within a predefined time, the host processor 310 controls and processes a function for switching the portable terminal to a sleep state, and induces a beacon/DTIM interval of the WLAN module 320 to be changed by informing the WLAN module 320 of entry to a sleep state. In addition, the host processor 310 in the sleep state awakens from the sleep state when a user's input occurs or by receiving a wakeup signal from the WLAN module 320, and performs a control for switching to the active state and processing a relevant operation.

The WLAN module 320 receives power from the host processor 310, and switches to a power save mode according to a request of the host processor 310 to repeatedly perform switching between an awake state and a sleep state on a beacon interval basis. At this point, the WLAN module 320 switches between the awake state and the sleep state according to a predefined beacon interval and DTIM interval during the power save mode. More particularly, when a signal informing of entry into a sleep state is received from the host processor 310, the WLAN module 320 changes the beacon interval and the DTIM interval during the power save mode. That is, when the portable terminal enters a sleep state, the WLAN module 320 changes the beacon interval and the DTIM interval to a long beacon interval and a long DTIM interval to minimize a time that the WLAN module 320 operates in an awake state, thereby reducing power consumption. After that, when a packet is received from an Access Point (AP) or a signal informing of a sleep state end is received from the host processor 310, the WLAN module 320 restores the beacon interval and DTIM interval to the original beacon interval and DTIM interval. Here, when a packet is received from the AP, the WLAN module 320 transmits a wakeup signal to the host processor 310 in the sleep state.

Figure 4:
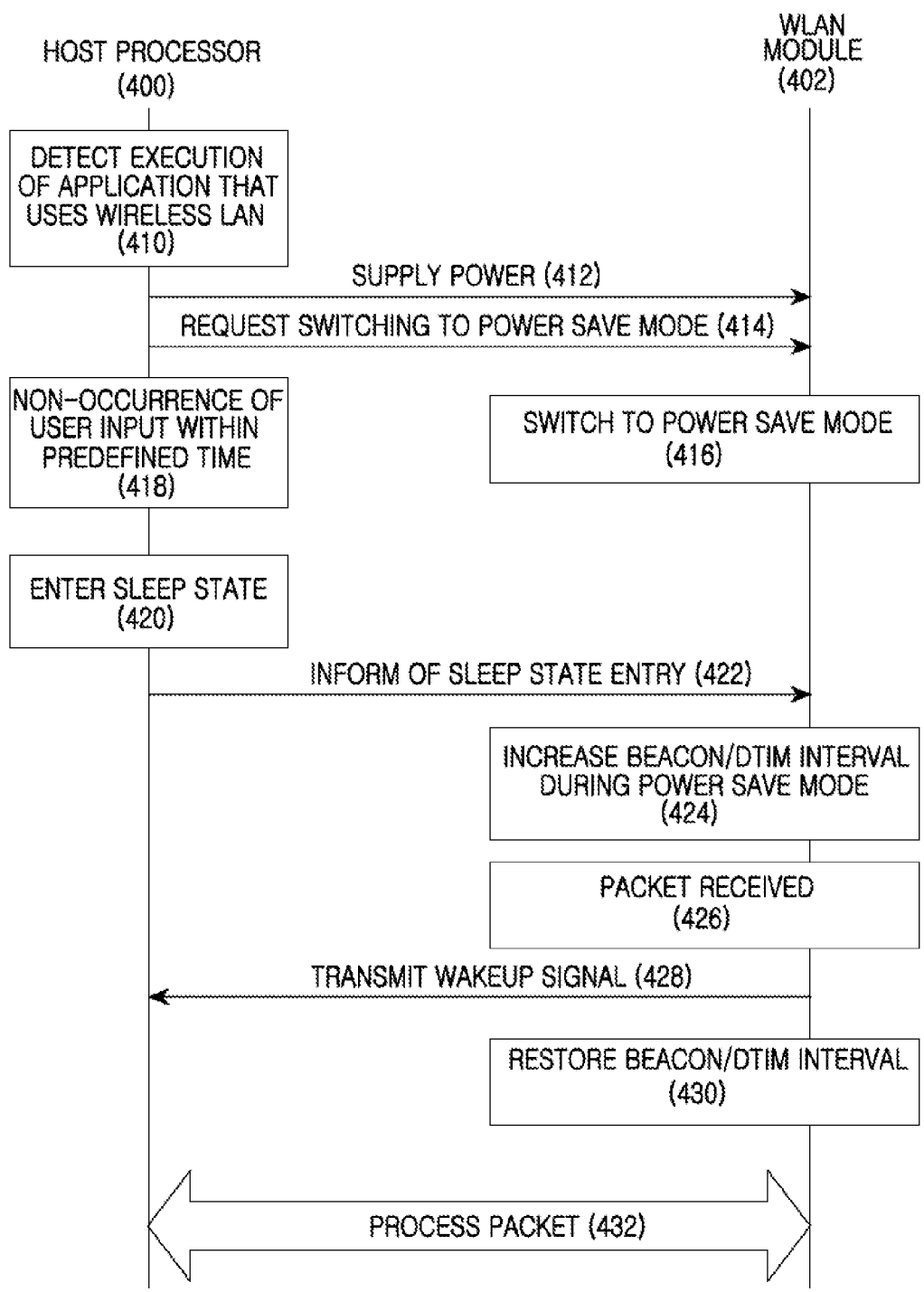
FIG. 4 is a flowchart illustrating a signal flow between a host processor and a Wireless Local Area Network (WLAN) module in a portable terminal according to an exemplary embodiment of the present invention.

FIG. 4 is a flowchart illustrating a signal flow between a host processor and a WLAN module in a portable terminal according to an exemplary embodiment of the present invention.

Referring to FIG. 4, the host processor 400 detects execution of an application that uses a WLAN in step 410. The host processor 400 supplies power to the WLAN module 402 in step 412, and requests the WLAN module 402 to switch to a power save mode in step 414. The WLAN module 402 that has received the request switches to the power save mode to repeatedly perform switching between an awake state and a sleep state on a beacon interval basis in step 416. At this point, the WLAN module 402 switches between the awake state and the sleep state based on the predefined beacon interval and DTIM interval. For example, the WLAN module 402 sets the beacon interval and DTIM interval to 100 ms and 300 ms, respectively, which are predefined values, to switch between the awake state and the sleep state.

The host processor 400 detects that a user's input does not occur within a predefined time in step 418, enters a sleep state in step 420, and informs the WLAN module 402 of sleep state entry in step 422. The WLAN module 402 increases the beacon interval and DTIM interval during the power save mode in step 424. For example, the WLAN module 402 switches between the awake state and the sleep state by changing the beacon interval and the DTIM interval, which have been set to 100 ms and 300 ms, respectively, to 200 ms and 1000 ms, respectively. It is possible to minimize a time for which the WLAN module 402 operates in the awake state by increasing the beacon interval and the DTIM interval while the host processor 400 is in the sleep state.

When it is detected that a packet is received in step 426, the WLAN module 402 transmits a wakeup signal to the host processor 400 in step 428, and restores the beacon interval and the DTIM interval in step 430. For example, the WLAN module 402 restores the beacon interval and DTIM interval, which have been set to 200 ms and 1000 ms, respectively, to 100 ms and 300 ms, respectively, which are the predefined values, and switches between the awake state and the sleep state. Here, step 428 and step 430 may be simultaneously performed, and the order of the performance may change. The host processor 400 that has received the wakeup signal ends the sleep state and switches to the active state.

The host processor 400 and the WLAN module 402 process a relevant packet in step 432.

Figure 5:
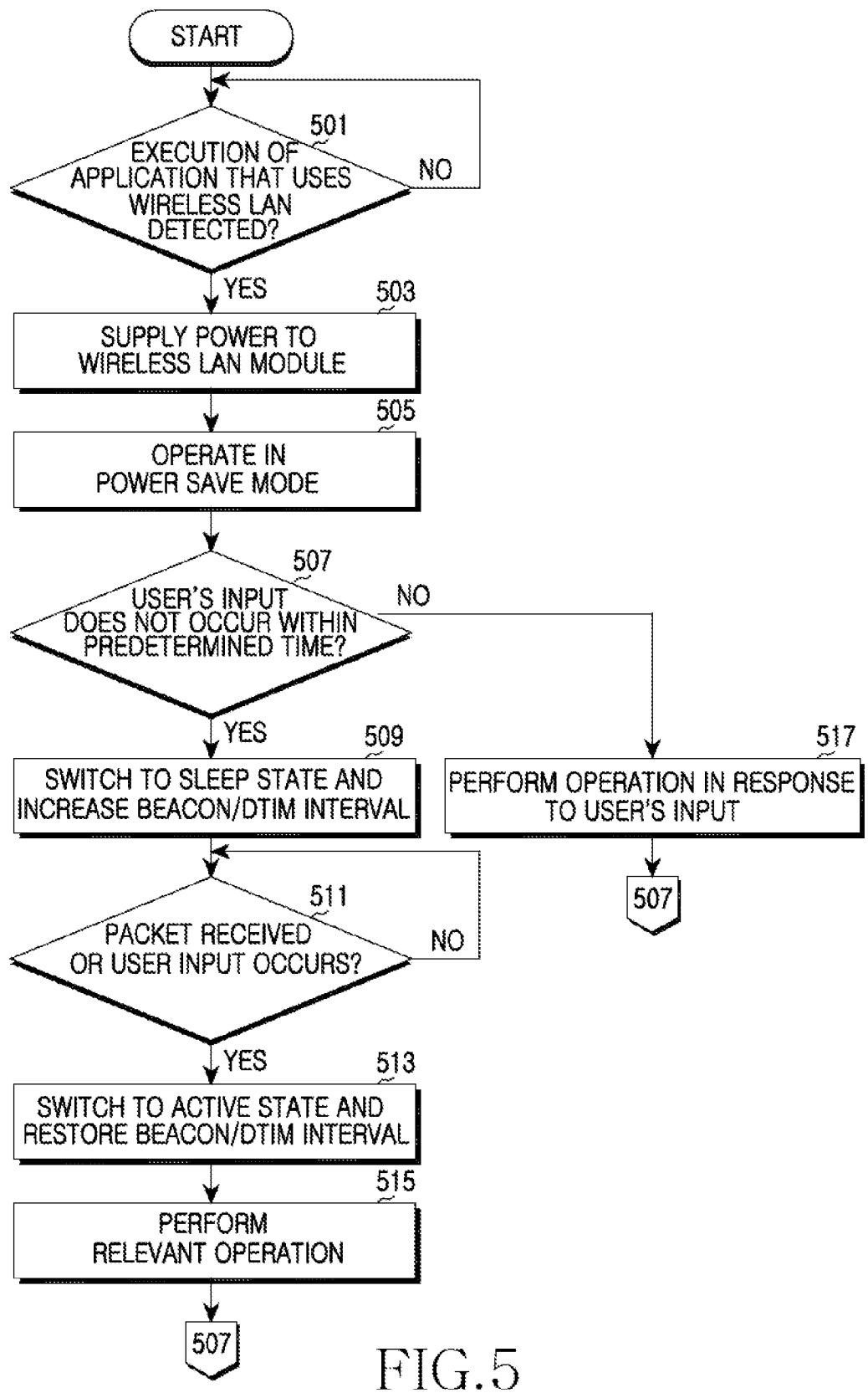
FIG. 5 is a flowchart illustrating an operation procedure of a portable terminal according to an exemplary embodiment of the present invention.

FIG. 5 is a flowchart illustrating an operation procedure of a portable terminal according to an exemplary embodiment of the present invention.

Referring to FIG. 5, when execution of an application that uses a WLAN is detected in step 501, the portable terminal supplies power to the WLAN module in step 503, and allows the WLAN module to operate in a power save mode in step 505. Here, the portable terminal allows the WLAN module to repeatedly switch and operate between the awake state and the sleep state based on the predefined beacon interval and DTIM interval.

The portable terminal detects whether a user's input does not occur within a predefined time in step 507. When a user's input occurs within the predefined time, the portable terminal performs an operation in response to the user's input in step 517, and returns to step 507.

In contrast, when the user's input does not occur within the predefined time, the portable terminal switches to the sleep state, informs the WLAN module of the sleep state, and increases the beacon interval and the DTIM interval in step 509. For example, when the WLAN module performs the power save mode at the beacon interval and the DTIM interval that have been set to 100 ms and 300 ms, respectively, the portable terminal changes the beacon interval and the DTIM interval to 200 ms and 1000 ms, respectively.

After that, the portable terminal determines whether a packet is received from an AP or a user's input occurs in step 511. When the packet is received or the user's input occurs, the portable terminal switches from the sleep state to the active state, and restores the increased beacon interval and DTIM interval in step 513. After that, the portable terminal performs a relevant operation in step 515. That is, the portable terminal processes a received packet or performs an operation in response to the user's input, and returns to step 507 to perform subsequent steps.

Though, when the host processor of the portable terminal enters the sleep state, the portable terminal changes the beacon interval and the DTIM interval in order to reduce power consumption of the WLAN module in the above description, the portable terminal may change only one of the beacon interval and the DTIM interval.

An exemplary embodiment of the present invention may reduce power consumption by a WLAN module provided to a portable terminal, as the portable terminal changes the beacon/DTIM interval depending on active/sleep state of the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing power of a Wireless Local Area Network (WLAN) module in a portable terminal, the method comprising:
    operating the WLAN module according to a Power Save Mechanism (PSM);
    determining whether the portable terminal operates in a sleep state; and
    changing a duration of at least one of a beacon interval and a Delivery Traffic Indication Map (DTIM) interval of the PSM depending on whether the portable terminal operates in the sleep state.

2. The method of claim 1, wherein the changing of the duration of the at least one of the beacon interval and the DTIM interval comprises:
    while the portable terminal operates in the sleep state, increasing the duration of the at least one of the beacon interval and the DTIM interval; and
    when the sleep state of the portable terminal ends, restoring the duration of the at least one of the beacon interval and the DTIM interval that was increased.

3. The method of claim 1, wherein the determining of whether the portable terminal operates in the sleep state comprises:
    when a user's input does not occur within a predefined time, determining that the portable terminal operates in the sleep state.

4. The method of claim 3, wherein, when it has been determined that the portable terminal operates in the sleep state, determining that the portable terminal no longer operates in the sleep state when the user's input occurs or a packet is received.

5. The method of claim 1, wherein the determining of whether the portable terminal operates in the sleep state comprises:
    when a user's input occurs within a predefined time, determining that the portable terminal does not operate in the sleep state.

6. The method of claim 1, wherein the PSM comprises a technique in which the WLAN module repeatedly switches between an awake state where the WLAN module operates with power of a predefined level or more to transmit/receive a packet, and a sleep state where the WLAN module operates with power of less than the predefined level and so packet transmission/reception is not performed.

7. An apparatus for managing power of a Wireless Local Area Network (WLAN) module in a portable terminal, the apparatus comprising:
    a host processor for detecting whether the portable terminal operates in a sleep state; and
    the WLAN module that operates according to a Power Save Mechanism (PSM), and that changes a duration of at least one of a beacon interval and a Delivery Traffic Indication Map (DTIM) interval of the PSM depending on whether the portable terminal operates in the sleep state.

8. The apparatus of claim 7, wherein the WLAN module increases the duration of the at least one of the beacon interval and the DTIM interval while the portable terminal operates in the sleep state, and restores the duration of the at least one of the beacon interval and the DTIM interval that was increased when the sleep state of the portable terminal ends.

9. The apparatus of claim 8, wherein after the host processor has determined that the portable terminal operates in the sleep state, the host processor determines the portable terminal no longer operates in the sleep state when a signal informing that the user's input occurs or a packet is received from the outside is received.

10. The apparatus of claim 7, wherein the host processor determines the portable terminal operates in the sleep state when a user's input does not occur within a predefined time.

11. The apparatus of claim 7, wherein the host processor determines the portable terminal does not operate in the sleep state when a user's input occurs within a predefined time.

12. The apparatus of claim 7, wherein the PSM comprises a technique in which the WLAN module repeatedly switches between an awake state where the WLAN module operates with power of a predefined level or more to transmit/receive a packet, and a sleep state where the WLAN module operates with power of less than the predefined level and so packet transmission/reception is not performed.

* * * * *